United States Patent Office 3,429,689
Patented Feb. 25, 1969

3,429,689
PHENOXY PYRIDINES AS HERBICIDES
Dieter Duerr, Basel, Otto Rohr, Neuallschwil, Hans Aebi, Riehen, and Ludwig Ebner, Stein, Aakgau, Switzerland, assignors to Ciba Limited, Basel, Switzerland, a company of Switzerland
No Drawing. Filed Jan. 27, 1965, Ser. No. 428,536
Claims priority, application Switzerland, Feb. 10, 1964, 1,532/64
U.S. Cl. 71—94
Int. Cl. A01n 5/00; C07d 31/32
5 Claims

ABSTRACT OF THE DISCLOSURE

Compounds of the general formula

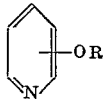

in which R is an aromatic radical which may be substituted by one or more halogen atoms, a lower alkyl or alkoxy radical or one of the groups —$NO_2$,—OH,—$CF_3$,

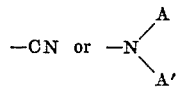

(in which A and A' be identical or different and each is a hydrogen atom or a lower alkyl group) or the N-oxides or salts of these compounds with acids, are biocidally active and, together with a suitable carrier, provide pesticidal preparations, particularly valuable for combating insects, acarides, nematodes and micro-organisms and in the control of plant growth.

---

The present invention provides preparations for combating pests, more especially harmful insects, acarides, nematodes and micro-organisms, and for controlling undesired plant growth, which preparations comprise as active substance a compound of the general formula (I)

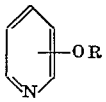

in which R represents an aromatic radical which may be substituted by one or more halogen atoms, a lower alkyl or alkoxy radical or one of the groups —$NO_2$, —OH, —$CF_3$, —CN or

(in which A and A' may be identical or different and each represents a hydrogen atom or a lower alkyl group) or comprise the N-oxides or salts of these compounds with acids, together with a suitable carrier.

If desired, there may also be present one or more of the following additives: a vehicle, a solvent, a diluent, a dispersant, a wetting agent, an adhesive, a fertilizer and other pesticides.

The present invention is especially concerned with those preparations of the kind mentioned above which comprise, as active substance, a compound of the general formula (II)

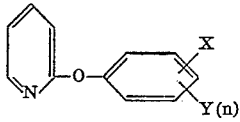

in which X represents a hydrogen atom, a chlorine atom or a bromine atom, or a lower alkyl group containing 1 to 4 carbon atoms or the group

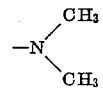

and Y represents a hydrogen atom or a chlorine atom, and $n=1, 2, 3$ or 4, or those which contain as active substance a compound of the general formula (III)

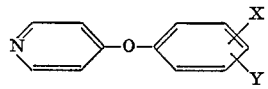

in which X and Y are identical or different and each represents a hydrogen atom or a chlorine atom, or a lower alkyl group containing 1 to 4 carbon atoms, or the group —$CF_3$, —OH or —$NO_2$.

By virtue of their broad biocidal effect, the new preparations have the advantage that they are suitable for combating a very wide variety of both vegetable and animal pests.

They are not only efficient herbicides but, when used in a concentration that does not produce any phytotoxic effects, they also display an outstanding activity against phytopathogenic organisms such as fungi, for example *Alternaria solani*, *Phytophthora infestans* and *Septoria apii*, as well as against insects that harm plants, acarides, nematodes and their ova and larvae.

Furthermore, the new preparations may be used quite generally as microbicides, for example against *Aspergillus species*, and also against bacteria for example *Staphylococcus aureus* or *Escherichia coli* and quite generally as insecticides, for example against midges and flies. They also display a molluscicidal action.

In the manufacture of solutions of the compounds of the general Formula I that are ready for spraying there may be used, for example, petroleum fractions of a medium to high boiling range for example diesel oil or kerosene, coal tar oil and oils of vegetable or animal origin, as well as hydrocarbons for example alkylated naphthalenes, or tetrahydronaphthalene, if desired with the use of xylene mixtures, cyclohexanols, ketones, also chlorinated hydrocarbons for example trichloroethane and tetrachloroethane, trichloroethylene or tri- and tetrachlorobenzenes. It is advantageous to use organic solvents that boil above 100° C.

Aqueous forms of application are preferably prepared by adding water to emulsion concentrates, pastes or wettable spray powders. Suitable emulsifiers or dispersants are nonionic products, for example condensation products of ethylene oxide with aliphatic alcohols, amines or carboxylic acids containing a long-chain hydrocarbon radical of about 10 to 20 carbon atoms, for example the condensation product of octadecyl alcohol with 25 to 30 mols of ethylene oxide, or of soybean fatty acid with 30 mols of ethylene oxide, or of commercial oleylamine with 15 mols of ethylene oxide, or of dodecylmercaptan with 12 mols of ethylene oxide. As suitable anionic emulsifiers there may be mentioned the sodium salt of dodecyl alcohol sulfuric acid ester, the sodium salt of dodecyl benzenesulfonic acid, the potassium or triethanolamine salt of oleic acid or of abietic acid or of mixtures of these two acids, or the sodium salt of a petroleumsulfonic acid. Suitable cationic dispersants are quaternary ammonium compounds, for example cetyl pyridinium bromide or dihydroxyethyl benzyl dodecyl ammonium chloride.

Solid vehicles suitable for the manufacture of dusting or casting preparations are talcum, kaolin, bentonite, calcium carbonate, calcium phosphate, or coal, cork meal, wood meal and other materials of vegetable origin. It is also very advantageous to manufacture the preparations in granular form. The various forms of application may further contain the usual additions of substances that improve the distribution, the adhesion, the stability towards rain or the penetration; as such substances there may be mentioned fatty acids, resins, glue, casein and alginates.

The preparations of the present invention may be used by themselves or in conjunction or admixture with conventional pesticides, especially insecticides, acaricides, nematocides, bactericides or further fungicides or herbicides respectively.

Particularly suitable for combating harmful insects and their ova as well as acarides are those new preparations which contain as active substance a compound of the formula

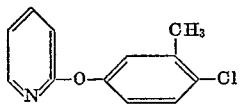

or the formula

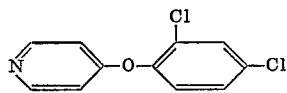

or of the formula

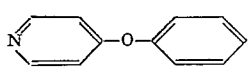

Particularly potent total or selective herbicides are those new preparations which contain as active substance one of the following compounds:

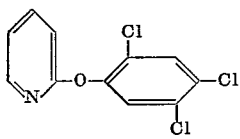

and

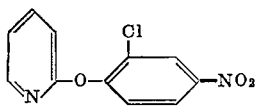

Especially suitably for combating harmful microorganisms, particularly phytopathogenic micro-organisms, are those new preparations which contain as active substance one of the following compounds

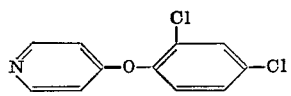

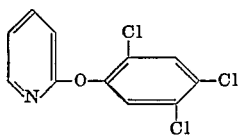

and

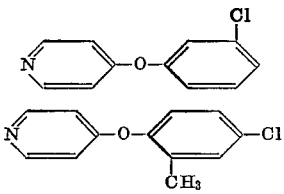

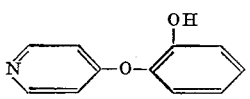

The compounds of the general Formula I may be manufactured by known methods, for example by heating bromopyridine with a phenol in the presence of an acid acceptor, or by heating N-pyridyl-(4)-pyridinium halides with a phenol. The salts of the compounds used in the present invention can be obtained in a simple manner by reaction with acids that are known to be capable of forming salts, for example with hydrochloric, sulfuric, nitric or perchloric acid. The N-oxides of the compounds used in this invention are likewise accessible by known methods by reaction with a suitable oxidant, for example hydrogen peroxide in an acetic acid solution.

The present invention further includes the new compounds of the following general formulae:

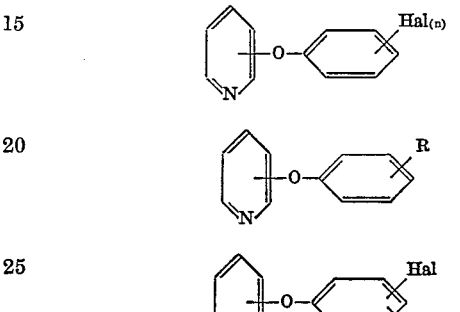

in which Hal represents a halogen atom, especially a chlorine or bromine atom, $n=2$ to 5, R represents an alkyl radical containing 2 to 4 carbon atoms, preferably 4 carbon atoms, or a lower dialkylamino group or the group —CN or a lower alkoxy radical, and also the N-oxides of the compounds of the general Formulae I to III, and the salts of these compounds, especially their sulfates and hydrochlorides.

The following examples illustrate the invention, the parts and percentages being by weight.

EXAMPLE 1

(a) 2-(meta-N,N-dimethylamino-phenoxy)-pyridine

A mixture of 45 grams of meta-N,N-dimethylaminophenol, 44.5 grams of 2-bromopyridine and 42 grams of potassium carbonate was heated to 210° C., while being stirred. After 3 hours, the reaction mixture was poured into water, rendered strongly alkaline by adding a 10 N-sodium hydroxide solution in order to dissolve the excess phenol and then extracted with ether. The ethereal solution was dried with sodium sulfate and evaporated. From the resulting residue, 41.2 grams of the product distilled out; it boiled at 126 to 129° C. under a pressure of 0.04 mm. Hg and melted at 45° C.

The following compounds can be manufactured in a similar manner:

TABLE I

| No. | Substance | B.P., ° C./mm. Hg | M.P., ° C. |
|---|---|---|---|
| 1 | 2-phenoxypyridine | 140/14 | |
| 2 | 2-(para-chlorophenoxy)-pyridine | | 83–84 |
| 3 | 2-(ortho-chlorophenoxy)-pyridine | 148–152/10 | |
| 4 | 2-(para-methylphenoxy)-pyridine | 110–112/0.35 | |
| 5 | 2-(pentachlorophenoxy)-pyridine | | 123 |
| 6 | 2-(2,4,5-trichlorophenoxy)-pyridine | 118/0.03 | 51 |
| 7 | 2-(para-tertiary butylphenoxy)-pyridine | 90/0.04 | |
| 8 | 2-(4-chloro-3-methylphenoxy) pyridine | 121/0.04 | |
| 9 | 2-(4-bromo-3-methylphenoxy) pyridine | 108/0.09 | |
| 10 | 2-(4-bromo-2-methylphenoxy) pyridine | 150/11 | |
| 12 | 2-(ortho-methylphenoxy)pyridine | 139–141/10 | |
| 13 | 2-(2,4-dichlorophenoxy) pyridine | 110–112/0.13 | |
| 14 | 2-(3-4-dichlorophenoxy) pyridine | 91–93/0.01 | |
| 15 | 2-(4-nitrophenoxy)pyridine | | 83.5 |
| 16 | 2-(4-bromophenoxy)pyridine | 159/8 | |

(b) 81.5 grams of 2,4-dichlorophenol and 96.3 grams of N-pyridyl-(4)-pyridinium chloride were heated at 160° C. until a clear melt had formed. This solution was poured into a ½ liter of sodium carbonate solution of 10% strength and was then extracted with ether. The ethereal solution was washed with 3×100 cc. of 2 N-sodium hydroxide solution and 3 times with water, dried over sodium sulfate and the ether was distilled off. The residue was distilled under a high vacuum, to yield 21.3 grams of a compound of the formula

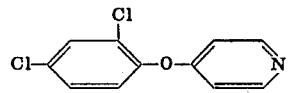

B.P. 109°–118°/0.02 mm. Hg; M.P. 45°–48°.

In a similar manner the following compounds were manufactured:

TABLE II

| | | |
|---|---|---|
| 17 | $O_2N$—⟨⟩—O—⟨N⟩ | M.P. 131°–133°. |
| 18 | Cl-substituted ⟨⟩—O—⟨N⟩ | B.P. 92°–95°/0.05 mm./Hg; M.P. 56°–58°. |
| 19 | $CH_3$-substituted ⟨⟩—O—⟨N⟩ | B.P. 84°–87°/0.04 mm./Hg. |
| 20 | $NO_2$-substituted ⟨⟩—O—⟨N⟩ | B.P. 130°–135°/0.07 mm./Hg; M.P. 74°–77°. |
| 21 | OH-substituted ⟨⟩—O—⟨N⟩ | M.P. 168°–170°. |
| 22 | ⟨⟩—O—⟨N⟩ | B.P. 103°–109°/0.3 mm. Hg. |
| 23 | $CH_3$-substituted ⟨⟩—O—⟨N⟩ | B.P. 130°–132°/11 mm. Hg. |
| 24 | Cl—⟨⟩—O—⟨N⟩ with $CH_3$ | B.P. 100°–104°/0.02 mm. Hg. |
| 25 | $C_2H_5$\CH/$CH_3$-substituted ⟨⟩—O—⟨N⟩ | B.P. 102°/0.02 mm. Hg. |
| 26 | $NO_2$-substituted ⟨⟩—O—⟨N⟩ | B.P. 124°–134°/0.05 mm. Hg; M.P. 64°–65°. |
| 27 | $H_3C$—⟨⟩—O—⟨N⟩ | B.P. 100°/0.3 mm. Hg. |
| 28 | $O_2N$—⟨⟩—O—⟨N⟩ with $CF_3$ | M.P. 64°–66°. |
| 29 | $O_2N$—⟨⟩—O—⟨N→O⟩ | M.P. 179°–185°. |
| 30 | $O_2N$—⟨⟩—O—⟨N·HCl⟩ | M.P. 204°–208°. |
| 31 | Cl—⟨⟩—O—⟨N·HCl⟩ with Cl | M.P. 185°–190°. |
| 32 | Cl—⟨⟩—O—⟨N→O⟩ with $CH_3$ | M.P. 67°–70°. |

TABLE II—Continued

| | | |
|---|---|---|
| 33 | Cl-C₆H₃(Cl)-O-C₅H₄N → O | M.P. 118°–120°. |
| 34 | Cl-C₆H₃(Cl)-O-C₅H₄N·H₂SO₄ | M.P. 162°–164°. |
| 35 | C₆H₄(NH₂)-O-C₅H₄N | M.P. 93°. |
| 36 | H₃CO-C₆H₄-O-C₅H₄N | |
| 37 | C₆H₄(CN)-O-C₅H₄N | |

EXAMPLE 2

For each test, 20 parts of one of the compounds of Example 1, Table I, No. 6 and Example 1(b) were mixed with 30 parts of xylene and 10 parts of an emulsifier ("Toximul Q"; makers Ninol Corp., Chicago), consisting of a mixture of a nonionic and an anionic surface-active substance, and each mixture was made up with xylene to 100 cc. Each dilution was a clear solution which was used as a spray concentrate and could be emulsified by being poured into water.

EXAMPLE 3

(A) Herbicidal effect

In a greenhouse, earthenware pots were filled with earth and seeded with the following plants: *Allium cepa, Alopecurus pratensis, Poa pratensis, Dactylis glomerata, Beta vulgaris, Calendula chrysantha, Linum usitatissimum, Brassica rapa, Daucus carota, Spinacia oleacea, Lactuca sativa, Medicago sativa, Soja max* and *Phaesolus vulgaris*.

(a) The pre-emergence treatment was carried out 2 days after seeding with spray broths prepared as described in Example 2, which contained as active substances the compounds of Example 1, Table I, No. 6 and Example 1(b). The amount applied corresponded to 20 kilograms of active substance per hectare. Evaluation was carried out 20 days after the treatment.

(b) The post-emergence treatment of the plant types enumerated above was carried out as described under (a) but only 12 days after seeding, when the plants had developed their second leaf. The amount applied corresponded to 10 kg. of active substance per hectare. Evaluation was carried out 16 days after the treatment.

The results obtained are shown in the following tables:

(a) Pre-emergence treatment

| Plants tested | Amount applied in kg./hectare | Compound No. 6 of Table I, Example 1 | Compound of Example 1(b) |
|---|---|---|---|
| Allium | 20 | 10 | 10 |
| Alopecurus | 20 | 10 | 10 |
| Poa | 20 | 8 | 10 |
| Dactylis | 20 | 3 | 10 |
| Beta | 20 | 9 | 10 |
| Calendula | 20 | 9 | 7 |
| Linum | 20 | 3 | 10 |
| Brassica | 20 | 10 | 9 |
| Daucus | 20 | 0 | 9 |
| Spinacia | 20 | 7 | 10 |
| Lactuca | 20 | 10 | 7 |
| Medicago | 20 | 10 | 10 |
| Soja | 20 | 1 | 3 |
| Phaseolus | 20 | 0 | 2 |

(b) Post-emergence treatment

| Plants tested | Amount applied in kg./hectare | Compound No. 6 of Table I, Example 1 | Compound of Example 1(b) |
|---|---|---|---|
| Allium | 10 | 10 | 10 |
| Alopecurus | 10 | 10 | 10 |
| Poa | 10 | 10 | 10 |
| Dactylis | 10 | 10 | 10 |
| Beta | 10 | 10 | 10 |
| Calendula | 10 | 9 | 9 |
| Linum | 10 | 10 | 10 |
| Brassica | 10 | 10 | 9 |
| Daucus | 10 | 1 | 8 |
| Spinacia | 10 | 10 | 10 |
| Lactuca | 10 | 10 | 6 |
| Medicago | 10 | 10 | 10 |
| Soja | 10 | 8 | 4 |
| Phaseolus | 10 | 6 | 7 |

Values of assessment: 0=No effect, 10=Plant completely destroyed.

A similarly good result was also obtained with compounds Nos. 2, 3, 4 and 8 of Table I of Example 1(a) and Nos. 15, 16, 17, 23 and 29 to 34 of Table II.

(B) Insecticidal effect (1) Ovicidal effect.—The compounds Nos. 1, 3, 8 and 14 of Table I and No. 16 of Table II of Example 1 completely killed off the ova of *Ephestia kuehniella* (flour moth) even in a concentration of only 0.025%.

(2) Contact effect against flies.—Compounds Nos. 20 and 21 of Table II of Example 1 displayed after ½ hour a 100% effect against *Musca domestica* and *Drosophila melanogaster*, for example in a concentration of 0.1% of active substance.

(3) Compound No. 5 of Table I and the compound of Example 1(b) displayed a good acaricidal effect against *Tetranychus* (two-spotted mites).

(C) Microbicidal effect

Compound No. 6 of Table I of Example 1 displayed a good microbicidal effect against phytopathogenic fungi; for example at a concentration of 0.2% of active substance a 90% effect against *Alternaria solani* on tomatoes and a 95% effect against *Erysiphe cichoriacearum* on *Cucumis pepo* was achieved without the plants treated being appreciably damaged. A similarly good result was also obtained with the compounds No. 3 of Table I and Nos. 16, 22, 29, 32 and 33 of Table II. Compound No. 19 of Table II of Example 1 also displayed a very good effect against *Staphylococcus aureus* and against *Escherichia coli*.

(D) The compounds of the general Formulae I to III can also be used as defoliating agents, especially for cotton.

What is claimed is:
1. A method for combating undesired plant growth which comprises applying to the area where the said effect is desired, a herbicidal amount of a member selected from the group consisting of
   (a) a compound of the formula

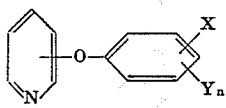

in which X represents a member selected from the group consisting of a hydrogen atom, a chlorine atom, a bromine atom, a nitro group, a trifluoromethyl group, a lower alkyl radical and the radical

wherein $A_1$ and $A_2$ each represents a member selected from the group consisting of a hydrogen atom and a lower alkyl radical, Y represents a member selected from the group consisting of a hydrogen atom and a chlorine atom, and $n$ represents a member of at most 4,
   (b) an N-oxide of a compound as defined in this claim under (a), and
   (c) a salt of a compound as defined in this claim under (a) with a member selected from the group consisting of hydrochloric, sulfuric, nitric, and perchloric acid.

2. A method for combating undesired plant growth which comprises applying to the area where the said effect is desired, a herbicidal amount of the compound of the formula

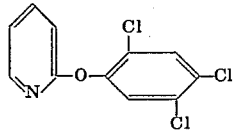

3. A method for combating undesired plant growth which comprises applying to the area where the said effect is desired, a herbicidal amount of the compound of the formula

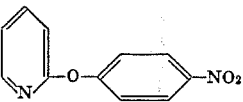

4. A method for combating undesired plant growth which comprises applying to the area where the said effect is desired, a herbicidal amount of the compound of the formula

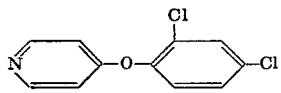

5. A preparation for combating undesired plant growth which comprises as active principle an herbicidal amount of a member selected from the group consisting of
   (a) a compound of the formula

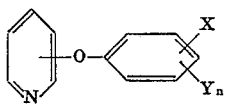

in which X represents a member selected from the group consisting of a hydrogen atom, a chlorine atom, a bromine atom, a nitro group, a trifluoromethyl group, a lower alkyl radical and the radical

wherein $A_1$ and $A_2$ each represents a member selected from the group consisting of a hydrogen atom and a lower alkyl radical, Y represents a member selected from the group consisting of a hydrogen atom and a chlorine atom, and $n$ represents a member of at most 4,
   (b) an N-oxide of a compound as defined in this claim under (a), and
   (c) a salt of a compound as defined in this claim under (a) with a member selected from the group consisting of hydrochloric, sulfuric, nitric, and perchloric acid, together with a carrier.

References Cited

UNITED STATES PATENTS

| | | | |
|---|---|---|---|
| 2,501,209 | 3/1950 | Craig | 71—2.5 |
| 2,299,782 | 10/1942 | Allen et al. | 260—297 |
| 3,244,722 | 4/1966 | Johnston et al. | 71—2.5 |
| 3,295,946 | 1/1967 | D'Amico | 71—2.5 |

LEWIS GOTTS, *Primary Examiner.*

G. HOLLRAH, *Assistant Examiner.*

U.S. Cl. X.R.

71—124; 260—297; 424—263